United States Patent [19]
Bohm et al.

[11] 4,108,749
[45] Aug. 22, 1978

[54] IRRADIATION PROCESS FOR THE PREPARATION OF POLY(VINYL CHLORIDE-G-ISOBUTYLENE) COPYLMERS

[75] Inventors: Georg Gustav Anton Bohm; Prakash Druman Trivedi, both of Akron; Joseph Kestutis Valaitis, Brecksville, all of Ohio

[73] Assignee: The Firestone Tire & Rubber Company, Akron, Ohio

[21] Appl. No.: 827,534

[22] Filed: Aug. 25, 1977

[51] Int. Cl.$^2$ ............................................. C08F 8/00
[52] U.S. Cl. ........................... 204/159.17; 260/877; 260/884
[58] Field of Search ............... 204/159.17; 260/884, 260/877

[56] References Cited
U.S. PATENT DOCUMENTS

| | | | |
|---|---|---|---|
| 3,281,345 | 10/1966 | Kühne | 204/163 |
| 3,359,193 | 12/1967 | Pinner | 204/159.17 |
| 3,433,724 | 3/1969 | Chapiro et al. | 204/159.17 |
| 3,904,708 | 9/1975 | Kennedy et al. | 260/878 R |
| 3,933,942 | 1/1976 | Kennedy et al. | 260/878 R |

OTHER PUBLICATIONS

Kennedy et al., *Journal of Polymer Science Chem. Ed.*, vol. 14, pp. 153–157, (1976).

*Primary Examiner*—Richard B. Turer

[57] ABSTRACT

Disclosed is a process for the preparation of a graft copolymer comprising a PVC backbone and graft branches formed from cationically polymerizable monomers such as styrene, isoprene, butadiene and in particular, isobutylene. The process includes the steps of irradiating the PVC resin to form reactive sites thereon, dissolving the irradiated resin in a suitable solvent, adding a monomeric charge of isobutylene and a catalytic amount of an alkylaluminum compound to polymerize a plurality of polyisobutylene branches from the reactive sites, subsequently terminating the reaction and separating the graft copolymer.

5 Claims, No Drawings

IRRADIATION PROCESS FOR THE PREPARATION OF POLY(VINYL CHLORIDE-G-ISOBUTYLENE) COPOLYMERS

BACKGROUND OF THE INVENTION

The present invention relates to a novel process for the preparation of graft copolymers of polyvinyl chloride and isobutylene or other cationically polymerizable monomers, via irradiation, containing higher amounts of isobutylene than have resulted from prior art grafting processes.

DESCRIPTION OF THE PRIOR ART

Prior art processes have provided for the copolymerization of polymeric materials including PVC with monomers in the presence of ionizing radiation. Representative patents in this category include U.S. Pat. Nos. 3,281,345, 3,359,193 and 3,433,724. However, such processes have generally disclosed irradiation of the polymeric material in the presence of the polymerizable monomer the result of which is that it has been difficult to control the conversion of the monomer. Obviously, if particular properties are desired in a graft copolymer, the percentage composition thereof can be as important as the selection of the components. Notwithstanding this defect, the prior art has not taught such a process for the synthesis of graft copolymers of PVC and isobutylene.

It is known, however, that polyvinyl chloride in the presence of certain alkylaluminum compounds, will initiate polymerization of isobutylene (IB) to produce poly(vinyl chloride-g-isobutylene), (PVC-g-PIB), copolymers. One such cationic grafting process is disclosed in U.S. Pat. Nos. 3,904,708 and 3,933,942, wherein a halogenated polymer, PVC, serves as a backbone for the graft of cationically polymerizable monomers, such as isobutylene, styrene, isoprene, butadiene and the like.

The product formed via this cationic grafting technique, utilizing triethyl aluminum ($R_3Al$) as a coinitiator, has contained relatively low amounts of polyisobutylene, e.g., less than 5% by weight conversion of the isobutylene monomer resulting in a polyisobutylene content in the graft of less than 15% by weight. Polyisobutylene, which acts as a plasticizer for the PVC, cannot render the graft copolymer as a useful, flexible material in such low amounts. To obtain such a product requires a polyisobutylene content of at least 20% and preferably higher which cannot be obtained when conversion of the isobutylene is less than about 10%. A higher conversion can be obtained utilizing diethylaluminum chloride. However, the grafting efficiency for this system is low, or less than about 50% as against the $R_3Al$ systems having an efficiency greater than 50%. The lower the efficiency, the greater is the formation of ungrafted PIB, which merely becomes waste. Thus, a process utilizing $R_3Al$ coinitiators, giving higher grafting efficiency and conversions of isobutylene is needed.

SUMMARY OF THE INVENTION

It is therefore an object of the present invention to provide a novel process for the preparation of a graft copolymer comprising a PVC backbone and polyisobutylene graft branches by preirradiating the PVC backbone to form allylic chlorides.

It is a further object of the present invention to provide a novel process for the preparation of PVC-g-PIB copolymers having from at least 20% to about 65% by weight of polyisobutylene in the product.

It is still a further object of the present invention to provide a novel process for the preparation of PVC-g-PIB copolymers wherein the step of preirradiating the PVC backbone is facilitated by subjecting the polymer to doses of irradiation of from more than 2 to about 15 Mrads from a source such as an electron beam.

It is another object of the present invention to provide a novel process for the preparation of PVC-g-PIB copolymers wherein the isobutylene monomer is grafted from a preirradiated PVC backbone in the presence of a trialkyl aluminum compound.

These and other objects of the present invention shall become apparent from the specification and claims which follow.

In general, the graft copolymer of the present invention is prepared by irradiating a quantity of PVC resin to form reactive sites in an environment substantially free from ambient air and extraneous impurities; dissolving the irradiated PVC resin in a suitable solvent, adding a cationically polymerizable monomer such as isobutylene and a catalytic amount of a trialkyl aluminum compound thereto for the polymerization of the isobutylene from the reactive sites carried by the irradiated PVC resin and subsequently terminating the reaction and extracting the graft copolymer.

DESCRIPTION OF THE PREFERRED EMBODIMENT

The polymerization reaction conditions under which the novel graft copolymer of the present invention can be prepared include polymerization times of from about 5 minutes to about 120 minutes with 60 minutes being preferred and a temperature of from about $-70°$ C to about $0°$ C, with $-45°$ C being preferred.

Selection of the polyvinyl chloride polymer is not necessarily critical. The number-average molecular weight of the backbone polymer can range from about 5,000 to about 200,000 with 30,000–130,000 g/mole being preferred. Similarly, the polyisobutylene branches can have number-average molecular weights per branch, ranging from about 5,000 to about 200,000 g/mole. In terms of weight %, it is believed that the amount of polyisobutylene branches in the product can range from about 5 to 65%, with the polyisobutylene content preferably being greater than about 20%. Variations in the amount of polyisobutylene, ranging from about 5 wt. % to about 65 wt. %, will vary the properties of the resultant graft product from hard plastic-like to soft elastomeric, respectively. Depending upon selected composition, the product can be used for making flexible tubes, films, wire coverings and coatings. While polyisobutylene is disclosed herein as exemplary of a preferred graft monomer, other cationically polymerizable monomers can be employed such as those disclosed in the aforementioned U.S. Pat. No. 3,904,708. For further reference to suitable cationically polymerizable monomers, those skilled in the art can refer to the book *Cationic Polymerization of Olefins: A Critical Inventory*, by Joseph P. Kennedy (John Wiley Interscience 1975).

The catalyst system of the present invention comprises a compound of the type $R_3Al$, where R is a branched or straight chain alkyl group having from 1 to about 12 carbons. Although the compound, i.e., trialkylaluminum, is referred to as the catalyst it is to be remembered that the compound works with the polymer halide as a coinitiator system which will enable the cationic polymerization of the olefins to commence and proceed from the polymer halide. Representative compounds which can be employed are listed in U.S. Pat. No. 3,694,377, the subject matter of which is hereby incorporated by reference. A particularly useful compound is trimethylaluminum, $Me_3Al$.

The reactants can be combined in the presence of a suitable solvent such as methylene chloride, 1,2-dichloroethane, 1,2-dichlorobenzene, toluene, xylene, or mixtures thereof.

In a typical laboratory synthesis of the novel graft copolymer claimed herein, the procedures employed were as follows:

A commercial PVC sample (Vestolit M6267, Chemische Werke Hüls Ag) was utilized for the grafting. Number-average molecular weight of the sample was 34,000 g/mole. Isobutylene (Union Carbide Corporation) was dried by passage over molecular sieves and barium oxide and methylene chloride (Matheson, Coleman & Bell Co.) was freshly distilled over calcium hydroxide prior to use. All reactions and manipulations were conducted in a stainless steel safety enclosure under dry nitrogen atmosphere (moisture content less than 50 ppm). The grafting reaction was conducted at a temperature range of from $-70°$ C. to $0°$ C. All parts are in terms of percent by weight unless otherwise specified.

Prior to reacting the PVC and isobutylene the polymer was irradiated as follows: 20 gms. of PVC resin was placed in a metal container having a transparent plastic window. For uniform irradiation the powder was distributed evenly in a layer of approximately 100 - 125 mils thickness. Because the irradiated PVC backbone is highly reactive, air and extraneous impurities were continuously evacuated from the cavity. Irradiation can be conducted over a broad temperature range e.g., from $-200°$ C to about $100°$ C, but preferably at a range between $-78°$ C and $0°$ C.

The cooled, evacuated PVC specimen was then placed on a conveyor which passed under a suitable source of radiation, e.g., high speed electrons such as generated by a conventional electron accelerator the purpose of which was to activate the backbone by removal of HCl, thus producing sites of unsaturation. The electron accelerator and conveyor velocity was next set so as to impart a dosage, preferentially uniform and sufficient for adequate activation of the backbone without causing serious degradation thereof. We have found dosages of more than 2 Megarads (Mrads) to about 15 Mrads to be acceptable, with a dosage of 10 Mrads yielding preferential results. At dosages of 2 or less, initiation of the isobutylene does not occur, while at dosages of about 15 Mrads severe degradation of the backbone would occur.

It is believed that the irradiation of the PVC resin eliminates HCl to provide sites of unsaturation and allylic chloride groups in a controlled manner. The allylic chloride groups on the PVC backbone then function as the initiator with the $R_3Al$ compound for the grafting reaction. The increase in the allylic chloride concentration results in the grafting of more isobutylene, thereby increasing the conversion, without sacrifice of the higher grafting efficiency. Inasmuch as allylic and tertiary chlorides present in the PVC are the true initiators, a PVC sample having a low concentration of these, e.g., bulk-polymerized PVC, can be employed in this process while in the conventional process no grafting could be obtained.

With a specimen of about 100 - 125 mils thickness, acceptable activation was provided by an electron accelerator operating at a 1 million electron volt (MeV) potential and having a 5 milliamp (mA) current, and in which the specimen was repeatedly passed under the electron beam until the desired dosage has been received. As is well-known, the operating potential and current may be adjusted so as to modify both the relative dosage absorbed by the specimen and/or the depth of penetration of the beam in the specimen. Similarly, the conveyor velocity and number of passes may be adjusted so as to control the absolute dosage transferred and the uniformity of the activation.

It should be emphasized that any source of energy capable of transfering adequate levels of energy can be utilized as the radiation source. Thus, merely by way of example, radioactive materials such as Cobalt-60 are also suitable for use herein. Additionally, UV light as well as infrared of specific wavelengths e.g., from lasers should also be suitable.

After the PVC had been irradiated to the desired dose, it was transferred to a dry box where it was dissolved under nitrogen in 1200 mls. of methylene chloride cooled to about $-45°$ C. To 600 mls. of this solution was added 100 mls. of isobutylene and 10 mls. of 1.5 M solution of trimethylaluminum in hexane. Five subsequent 10 ml. additions of the catayst were added at 10 minute intervals after which time the reaction was terminated with methanol and the polymer product was precipitated out and dried.

In Table I, six experiments are listed for the grafting of polyisobutylene from PVC backbones having 0 - 10 Mrads of absorbed dose. Experiments 1-3 indicate that no graft product was formed. Experiment 2 was a repeat of experiment 1 to verify that no graft took place in the absence of preirradiation of the backbone. However, in experiments 4-6, 10 Mrads dosage were employed and PVC-g-PIB was obtained. In experiment 4, an isobutylene conversion of 11% was determined as was the PIB content in the product of 26%. Sufficient time was not available to allow determination of the polyisobutylene content of the extracted graft and likewise, the grafting efficiency. In experiment 5, the monomer conversion was 27% and the PIB content was 79%. Extraction with hexane yielded an insoluble product having a PIB content of 33%. The grafting efficiency was determined to be 50%. In experiment 6, a monomer conversion of 7% was determined and a PIB content of 23%. Upon hexane extraction, no PIB could be dissolved, which indicated almost 100% grafting efficiency, and the PIB content of the insoluble product again indicated 23%. Although the graft products obtained from the preirradiated backbone of experiments 4-6 each had a different PIB content, each backbone was given the same amount of radiation. Variations observed are merely believed to be attributable to possible side reactions.

Table I

| | Effect of PVC Irradiation on the Synthesis of PVC-g-PIB | | | | |
|---|---|---|---|---|---|
| Expt. No. | Dose Rate Mrad. | Isobutylene Conversion % | PIB Content (a) of Product Wt. % | Grafting Efficiency % (b) | PIB Content (a) of Extracted Graft Wt. % |
| 1 | 0 | 0 | 0 | — | 0 |

Table I-continued
Effect of PVC Irradiation on the Synthesis of PVC-g-PIB

| Expt. No. | Dose Rate Mrad. | Isobutylene Conversion % | PIB Content (a) of Product Wt. % | Grafting Efficiency % (b) | PIB Content (a) of Extracted Graft Wt. % |
|---|---|---|---|---|---|
| 2 | 0 | 0 | 0 | — | 0 |
| 3 | 2 | 0 | 0 | — | 0 |
| 4 | 10 | 11 | 26 | — | — |
| 5 | 10 | 27 | 79 | 50 | 33 |
| 6 | 10 | 7 | 23 | 100 | 23 |

(a)PIB content of the products was determined by IR analysis.
(b)Grafting efficiency = Wg × 100/(Wg + Wh), where Wg is the weight of PIB grafted and Wh is the weight of ungrafted PIB.

Thus, it can be seen that the disclosed invention carries out the objects of the invention set forth hereinabove. By irradiating the PVC backbone before the graft polymerization of the isobutylene, higher conversions of the monomer are obtained and likewise, higher percentage of the polyisobutylene in the graft product results at higher grafting efficiencies. As will be apparent to those skilled in the art, properties of the novel graft copolymer can be varied by selection of equivalent monomers as well as the resultant molecular weight and percent composition of the product and, it is believed that the preparation of these can be obtained without departing from the spirit of the invention herein disclosed and described, the scope of the invention being limited solely by the scope of the attached claims.

We claim:

1. A process for the preparation of a graft copolymer comprising the steps of:
    irradiating a quantity of PVC resin to form reactive sites in an environment substantially free from ambient air and extraneous impurities said irradiation dose being more than 2 to about 15 Mrads;
    dissolving said irradiated PVC resin in a suitable solvent;
    adding a monomeric charge of isobutylene monomer and a catalytic amount of a trialkyl aluminum compound to said irradiated resin dissolved in said solvent at a temperature of from about −70° C to about 0° C whereby said reactive sites and said trialkyl aluminum compound initiate polymerization of said monomer; and,
    thereafter terminating the reaction and precipitating the graft copolymer product.

2. A process for the preparation of a graft copolymer, as in claim 1, wherein the step of irradiating said PVC resin includes the step of:
    exposing said PVC resin to a source of radiation of sufficient levels of energy to activate the backbone.

3. A process for the preparation of a graft copolymer, as in claim 2, wherein said step of exposing said resin includes the step of:
    passing said PVC resin through a beam of high speed electrons so as to impart an absorbed dose of about 10 Mrads.

4. A process for the preparation of a graft copolymer, as in claim 1, wherein said trialkyl aluminum compound is trimethylaluminum.

5. A process for the preparation of a graft copolymer, as in claim 1, wherein the weight % of said monomer in the desired product is from about 5.0 to about 65.0.

* * * * *